United States Patent
Eschbach et al.

(10) Patent No.: US 8,111,432 B2
(45) Date of Patent: Feb. 7, 2012

(54) INFRARED WATERMARKING OF PHOTOGRAPHIC IMAGES BY MATCHED DIFFERENTIAL BLACK STRATEGIES

(75) Inventors: Reiner Eschbach, Webster, NY (US); Martin S. Maltz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 714 days.

(21) Appl. No.: 12/106,709

(22) Filed: Apr. 21, 2008

(65) Prior Publication Data
US 2009/0262400 A1 Oct. 22, 2009

(51) Int. Cl.
*H04N 1/40* (2006.01)
*H04N 1/46* (2006.01)
*G06K 9/00* (2006.01)

(52) U.S. Cl. .................. 358/3.28; 382/100; 358/540

(58) Field of Classification Search ............. 358/3.28, 358/540, 450; 283/92; 382/100; 380/28, 380/232
See application file for complete search history.

(56) References Cited

U.S. PATENT DOCUMENTS

| | | | |
|---|---|---|---|
| 2002/0067844 A1 | 6/2002 | Reed et al. | |
| 2006/0008112 A1* | 1/2006 | Reed et al. | 382/100 |
| 2007/0262579 A1* | 11/2007 | Bala et al. | 283/92 |
| 2007/0264476 A1 | 11/2007 | Bala et al. | |
| 2008/0199785 A1 | 8/2008 | Bala et al. | |
| 2008/0299333 A1 | 12/2008 | Bala et al. | |
| 2008/0302263 A1 | 12/2008 | Eschbach et al. | |
| 2008/0305444 A1 | 12/2008 | Eschbach et al. | |

OTHER PUBLICATIONS

Sohail A. Dianat et al., Dynamic Optimization Algorithm for Generating Inverse Printer Maps with Reduced Measurements; Accepted for publication 2006 IEEE International Conference on Acoustics, Speech and Signal Processing. Toulouse, France, May 14-19, 2006.
European Search Report, Application No. EP 09 15 3475.0—1228/2112816, filed Feb. 23, 2009.

\* cited by examiner

*Primary Examiner* — Charlotte M Baker
*Assistant Examiner* — Justin Katzwhite
(74) *Attorney, Agent, or Firm* — Fay Sharpe LLP

(57) ABSTRACT

A system and method for infrared watermarking using gray component replacement and other color removal schemes is shown. This method includes providing a substrate and implementing two infrared absorption strategies, one with low infrared absorption and the other with high infrared absorption. These two strategies are then combined in order to form two gamuts with substantially similar shapes. This combination can be made by blending the gamuts at areas where one of the strategies do not meet or implementing the intersection of the two gamuts. A watermark is then printed along with an image. The resultant image with watermark is void of artifacts while still having a consistent watermark signal.

15 Claims, 4 Drawing Sheets

INFRARED WATERMARKING OF PHOTOGRAPHIC IMAGES BY MATCHED DIFFERENTIAL BLACK STRATEGIES

CROSS REFERENCE TO RELATED PATENTS AND APPLICATIONS

Cross-reference is made to the following applications which are incorporated by reference for their teachings in their entirety herein: Eschbach et al., U.S. Patent Publication No. 2008-0302263 A1, filed Apr. 21, 2008, entitled "INFRARED ENCODING OF SECURITY ELEMENTS USING STANDARD XEROGRAPHIC MATERIALS"; Bala et al., U.S. patent application Ser. No. 11/708,313, filed Feb. 20, 2007, entitled "SUBSTRATE FLUORESCENCE MASK UTILIZING A MULTIPLE COLOR OVERLAY FOR EMBEDDING INFORMATION IN PRINTED DOCUMENTS"; Bala et al., U.S. patent application Ser. No. 11/382,897, filed May 11, 2006, entitled "SUBSTRATE FLUORESCENCE MASK FOR EMBEDDING INFORMATION IN PRINTED DOCUMENTS"; Bala et al., U.S. patent application Ser. No. 11/382,869, filed May 11, 2006, entitled "SUBSTRATE FLUORESCENCE PATTERN MASK FOR EMBEDDING INFORMATION IN PRINTED DOCUMENTS"; and Bala et al., U.S. patent application Ser. No. 11/754,702, filed May 29, 2007, entitled "SUBSTRATE FLUORESCENT NON-OVERLAPPING DOT PATTERNS FOR EMBEDDING INFORMATION IN PRINTED DOCUMENTS".

BACKGROUND OF THE DISCLOSURE

This disclosure relates to a method and system for embedding information onto a substrate. More particularly, this disclosure is related towards a method and system for infrared watermarking using modified Gray Component Replacement/Under Color Removal (GCR/UCR) schemes and thus will be described with particular reference thereto. However, it should be appreciated that some embodiments are amenable to other applications.

By way of background, watermarking is a common way to enable security and other features in document production. This technique permits the insertion of information in the form of digital image signals onto documents. This information may include copyright notices, security codes, identification data, bar codes, etc. This information may be hidden in images and exposed through various methods. This data may also be grouped in bits describing the information pertaining to a signal which can be read by a signal reader. Most common watermarking methods for images work in spatial or frequency domains.

It is desirable for this data to remain hidden under normal visible light for practical and aesthetic purposes. It is also desirable to provide an infrared reading method that is capable of exposing the hidden data once it employs rendering techniques. The traditional approach is to render the encoded data with special inks that are not visible under normal light but have strong distinguishing characteristics under certain types of spectral illumination. However, these special inks and materials are often difficult to incorporate into standard electro-photographic or other non-impact printing systems.

Generally, the same visual color can be achieved with different amounts and combinations of respective available colorants. This can easily be understood when considering that the human visual system—to a good approximation—can be modeled by a three component system, whereas printing is commonly achieved in a four or more component printing system. This underdetermined situation offers additional degrees of freedom that can be otherwise utilized. A common terminology used in the context of representing a three component color system with a four or more component rendering system is "metameric rendering". Therefore, when reading in an input color, various amounts of different toner may be used in order to match the desired effect. In the infrared scenario, a generalization can be performed to arbitrary input images since the infrared characteristic is dominated by carbon black toner presence. This is the case even when the toner uses a continuous feed despite the flash fusing requiring a high absorption for melting. Consequently, many early examples of infrared watermarking use two different black strategies and switched between the two is a function of the watermark. In order to indicate the effectiveness of the infrared absorption, images in the prior art suffered from strong artifacts in image reproduction. The differences in color were visible in the two different areas, making the effect unusable. The main source of artifact seems to be the different color range and different black strategies as well as the gamut mapping induced difference in output color.

There have been attempts in the art to overcome the aforementioned difficulty. One technique includes creating an infrared mark employing different infrared transmission characteristics of four or more different printing colorants. This creates an infrared mark by printing a first colorant combination with high infrared reflectance in close proximity to a second colorant with the same visual response under visible light while having a different infrared reflectance. This method, however, does contain some drawbacks inherent within the process. One drawback includes a limited color palette because it is difficult to produce many colors under visible light that have the desired response under infrared light and thus the general inability to use this approach for infrared encoding of natural scene and other images. Also, often when these colors are placed in close proximity, artifacts can still be seen despite their relatively similar appearance under visible light. Another drawback to this method includes when attempting to correct the artifacts, oftentimes there is a low strength of the watermark in many areas. This in part due to the intent of color matching using two different color gamuts, one with high infrared absorption ability and the other with low infrared absorption ability.

Other attempts have been made in order to correct apparent fault in the prior art, one of which is to create watermarks that closely align with the image being created. In this form the watermark can be hidden in shadows that are cast by the image itself. This, however, limits the watermarks effectiveness as arbitrary marks cannot be obtained. The watermarks in this embodiment must generally be related to the image which is attempting to be portrayed.

Therefore, there is a need in the industry for an infrared watermarking solution that can be performed to arbitrary input images. There is also a need in the industry for a solution to have a minimal impact on system overhead requirements, including storage and digital processing requirements. Furthermore, it is desirable that the solution be obtained without physical modification to the printing devices and without the need for costly special upgrades in materials and media formats. This disclosure solves the above-referenced difficulties as well as many others.

BRIEF DESCRIPTION

Aspects of the present disclosure and embodiments thereof include the following apparatus embodiments. A color mixture derived from at least a high infrared absorption gamut and a low infrared absorption gamut where each of the high infrared absorption gamut and low infrared absorption gamut originated from a correlation of a high infrared absorption origination gamut and a low infrared absorption origination gamut and both the high infrared absorption gamut and low infrared absorption gamut are similarly shaped, and a substrate configured to reflect the color mixture.

According to another aspect of the claimed disclosure, a method for infrared watermarking using gray component replacement/under color removal schemes includes providing a substrate, implementing a low infrared absorption gamut strategy yielding a low infrared absorption gamut. The method continues with implementing a high infrared absorption gamut strategy yielding a high infrared absorption gamut. The method continues on with creating a gamut correlation mechanism which combines both the low infrared absorption gamut and the high infrared absorption gamut into substantially similar limited shaped gamuts and printing a watermark on the substrate implementing the limited substantially shaped gamuts.

According to another aspect of the claimed disclosure, a method for creating an infrared mark on an image comprises receiving an input image to print, adopting a printing strategy yielding a correlative effect between a high infrared absorption gamut and a low infrared absorption gamut where the correlative effect transforms the high infrared absorption gamut and the low infrared absorption gamut into identically shaped gamuts, and printing the input image on an infrared reflective substrate applying the strategy where the high infrared absorption gamut and the low infrared absorption gamuts are used interactively in order to create an infrared watermark.

According to another aspect of the present disclosure, the method for creating an infrared watermark further includes a printing strategy that maps the input image to a boundary of the low infrared absorption gamut limiting the high infrared absorption gamut to a shape that is equivalent to the low infrared absorption gamut.

According to another aspect of the present disclosure, the method includes that the printing strategy maps the input image to a blending of the high infrared absorption gamut and the low infrared absorption gamut where at least one of the high infrared absorption gamut or low infrared absorption gamut area is excluded from the other.

DETAILED DESCRIPTION

As described in more detail below, this disclosure relates to a system and a method for infrared watermarking of photographic images by matched differential black strategies. This disclosure describes an extension to the existing infrared coding approach based on pre-selected color palettes by using a combination of different approaches incorporating a gamut intersection mechanism. This disclosure teaching mapping two strategies into a common gamut shape for printing arbitrary infrared watermarks. One embodiment employs a strategy creating two matching gamuts as the intersection of the two initial gamuts. A second strategy teaches blending the two gamuts in the exclusionary area, still creating a single shape for the two gamuts. These single shape gamuts are used in the standard color correction process to create the input color to output print colorant transformation, commonly to create Lab to CMYK data.

Figure 1:
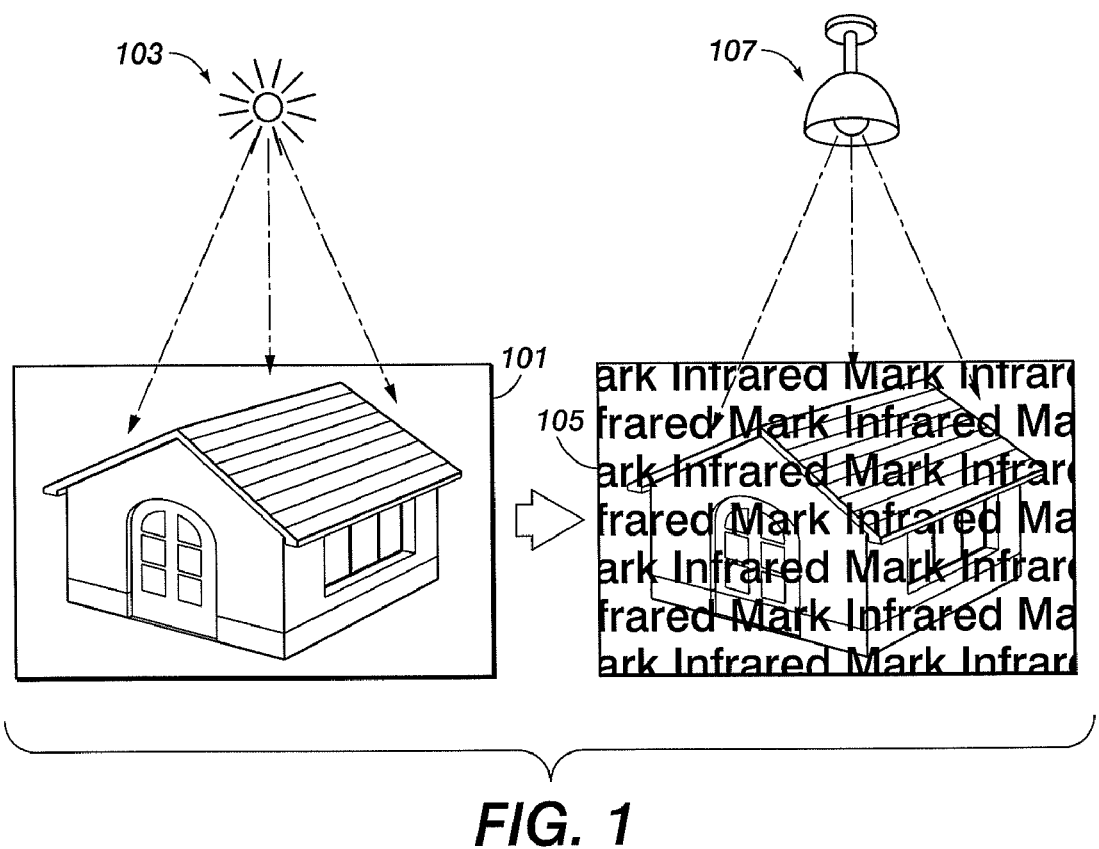
FIG. 1 is an illustration that schematically depicts an image viewed by a human under visual light and the same image viewed by an infrared camera.

Now referring to FIG. 1, one embodiment of a resultant printout is shown. This embodiment depicts a printed document 101 as shown under visible light 103 appears to be a house. However, the document 105 as viewed by an infrared camera 107 shows an infrared message "Infrared Mark".

FIG. 1 depicts but one embodiment according to the present disclosure. It should be understood that document 101, as shown under visible light 103, may include any variety of images. In one embodiment, the image is in vivid color displaying no artifacts. Document 105 which is the same as Document 101 is shown under infrared light displays an arbitrary message. For brevity, we will consider the term "infrared light" to always refer to the ability to detect a infrared signal using the appropriate combination of infrared illuminate and infrared detectors, such as cameras, scanners and the like. The arbitrary infrared message may include information that can be read by any variety of readers. In one embodiment, the infrared markings display a bar code which may be scanned in order to list the price of an item. In another embodiment, Document 105 displays a security symbol ensuring that the document originates from a certain source. It should be noted that Document 101 and 105 display different images although they are the same document. The difference in light source exposes the amount of infrared absorption capabilities of the ink.

Figure 2:
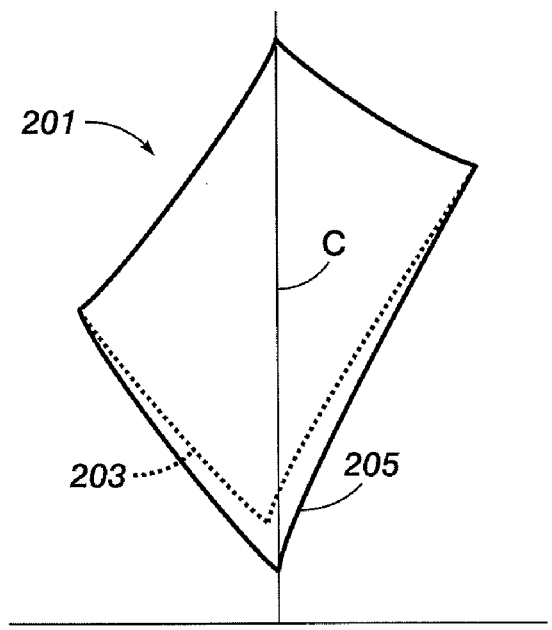
FIG. 2 schematically depicts a cross-sectional profile of a gamut for a high black K printing strategy and a low black K printing strategy.

Now referring to FIG. 2, which shows different gamut extensions for a low K case 203 and high K case 205. In general, the lower part of the gamut is influenced by a black strategy. Using different black strategies or different GCR/UCR schemes, different effective gamuts can be obtained. In general terms, the gamut for the low K strategy is normally limited on the dark end to less dark colors. Stated another way, the low K gamut 203 has a higher minimum range. Therefore, it is difficult to reach lower colors C on this gamut 203 with the low K strategy. In common systems, it is also the K component of the printing material that has the biggest infrared differentiation among the materials and thus the low K and low infrared absorption gamuts are commonly identical. The scenario of FIG. 2 can easily be generalized to cases where the K component is not the infrared differentiator, but the conceptual problem of mismatched gamuts will still exist. However, by creating a gamut 301 correlation mechanism which combines both the low infrared absorption gamut 203 and the high infrared absorption gamut 205 into substantially similar shaped gamuts, the color differential disappears between the two gamuts. This is at least in part due to the fact that these two gamuts are the same shape. This will facilitate in printing a watermark without artifacts between the two gamuts.

In one embodiment a gamut limiting method is introduced which maps the input image to the boundary of the low K gamut 203, where for the purpose of description we will equate the K (black) toner (ink, etc.) with the dominant infrared modifying material. Independent of whether the watermark dictates the color from the high K 205 or low K 203, black strategy. This gamut limitation also automatically corrects the gamut mapping of color C since both cases are now mapped using the identical target gamut 201. It should be noted that even if there is an influence in the cusp location, finding a minimal gamut will adjust those gamut target points. In one embodiment, the input colors lead to a stronger and more consistent watermark signal. This does however limit the overall size of the gamut to, generally, the low K 203 strategy.

Figure 3:
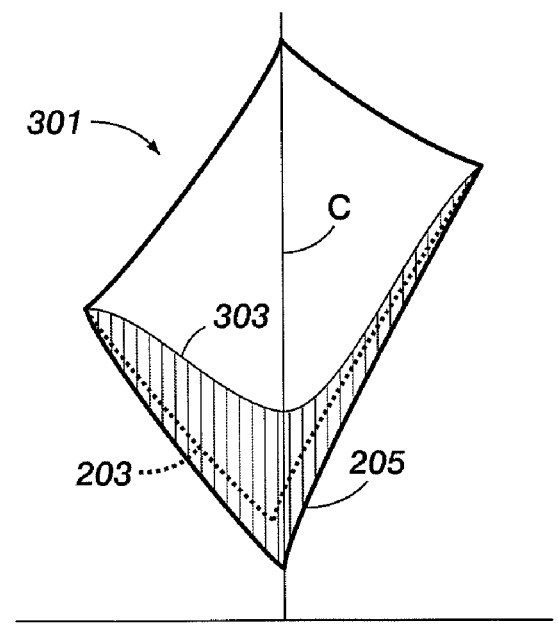
FIG. 3 schematically depicts the gamut of FIG. 1 employing a blending strategy.

Now referring to FIG. 3 which is a similar gamut to the one in FIG. 2. This gamut 301, however, employs a blending strategy where the original two gamuts are blended into a single shape 301. Here the low K gamut 203 switches to the high K gamut 205 at regions not available in the low K gamut 203 approach.

It is understood that different gamut approaches could be taken that would still yield identical gamut boundaries for each gamut. These approaches would also yield identical gamut mapping results. It is further understood that these could be done without limiting the overall gamut size to the smallest common denominator. As shown in FIG. 3, blending can fulfill this need. In the region close to the boundary 303 of the smaller gamut 203, gamut blending is performed that will result in a complete switch outside the smaller gamut 203. This switch is however done with a blending approach which will change the color C gradually as it approaches the lower bound. In this embodiment the overall color gamut is increased. Furthermore, a large number of dark colors is now mapped to two identical CMYK colorant mixtures, depending on the blending function. In either case (the intersection or blending) the two gamuts (low K and high K) are identical in their shape and size for all color conversions.

Figure 4:
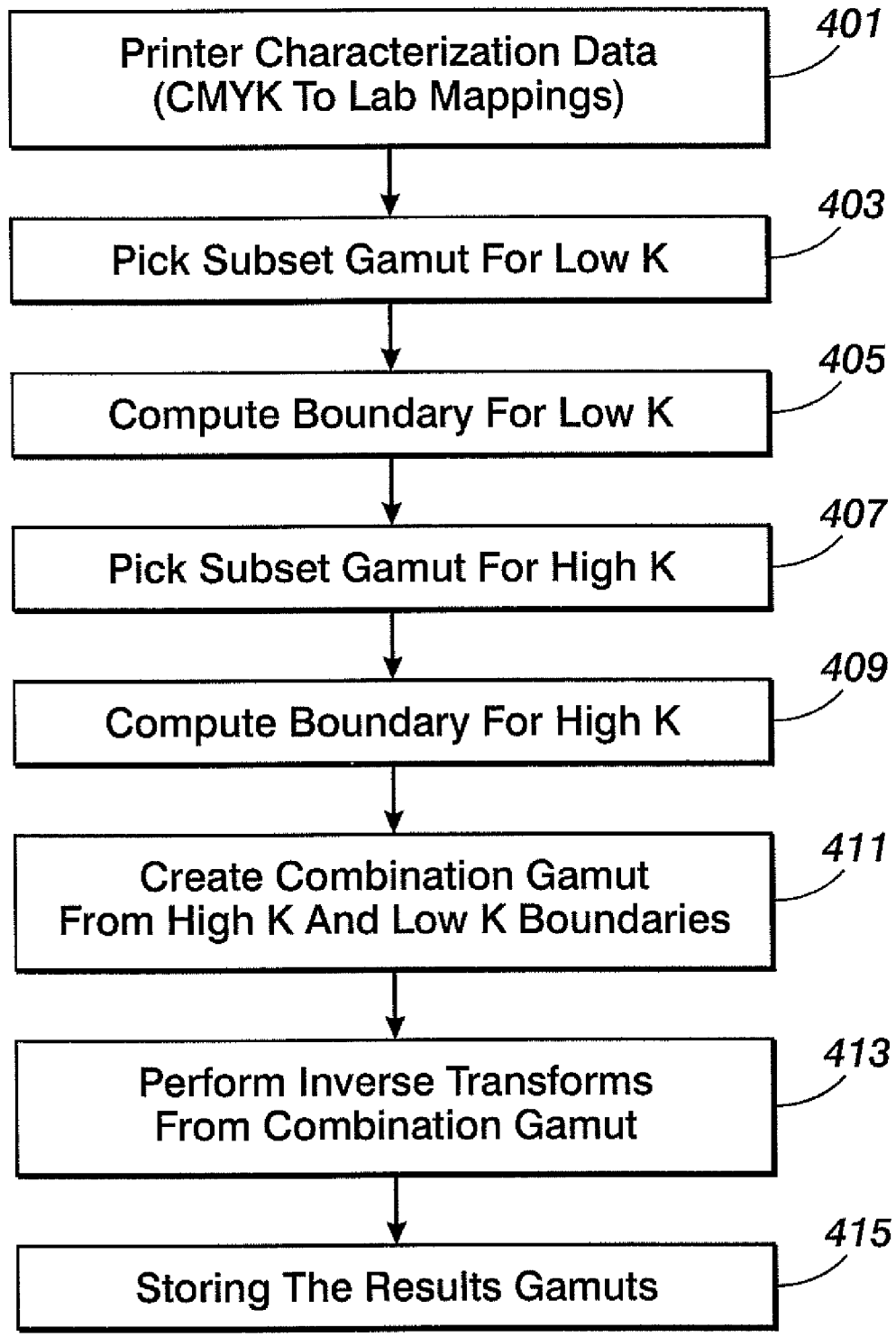
FIG. 4 provides a flow chart of a method of creating gamuts and subsequent corresponding profiles according to one embodiment according to the present disclosure.

Now referring to FIG. 4, a flow chart outlining one method of creating gamuts according to one embodiment is shown. The method begins with printer characterization data (at step 401). These characterization data are generally created by printing pre-determined CMYK combinations and by measuring the resultant colors. The resultant colors may be measured in Lab, RBG, etc.

The method continues with adopting a low K strategy (at step 403) and thereby by defining the extend to which CMYK combinations can create Lab colors under the restricted use of the K component. The low K strategy will result in a low K gamut. The gamut is generally used as printer space and imbedded inherently with the three component to four component transformation as will be seen later.

The method continues with computing the boundary for the low K gamut (at step 405). The boundary for the low K gamut is used the subsequent steps of the method.

The method then continues (at step 407) with adopting a high K strategy and resulting gamut. This is similar to the previous step of adopting a low K strategy except in this step the black component is significantly higher. This is mainly due to the black's relationship with infrared absorption.

The method continues (at step 409) with computing the boundary for the high K gamut. Similar to step 405, a boundary is computed for the high K gamut.

The method continues (at step 411) with choosing blending or clipping as a strategy for producing a combination resulting gamut. Generally speaking, a resultant gamut that is produced via blending will employ a larger gamut 301 and produce a higher range of color. However, a gamut that is produced via clipping will create a more consistent watermark signal using a smaller gamut 201.

The combination gamut is now chosen to serve as the gamut boundary for the inversion of the characterization (at step 413), id est, for inverting the CMYK to Lab transform into the needed Lab to CMYK transform using standard color management methods. In effect, the inversion table is populated by characterization data that both fulfill the infrared requirement (through their respective high and low K attributes) as well as the gamut boundary requirement. In a clipped scenario this essentially limits the characterization data that is to be used and in the blending scenario this essentially populates some of the entries with CMYK and Lab combinations that do not fulfill stringent infrared requirements.

The method continues (at step 415) with storing the two resultant Lab to CMYK trasnforms as the high K and low K gamuts. Regardless of the method used (blending or clipping) the resultant high K and low K gamuts are the gamuts that are stored for processing the image, where for brevity we use "low K gamut" to indicate the Lab to CMYK inverse transform derived from the gamut boundary of the low K gamut.

It should be noted that this is but one embodiment of the disclosure. The steps of the method may be performed in a variety of different orders and still derive a useful and oftentimes similar results. Furthermore, many of the steps fo the method may be performed simultaneously with other steps. Additionally, if a different toner than the previosly mentioned K toner exhibits a strong infrared characteristic, the process outlines in FIG. 4 can be changed accordingly to reflect the different toner.

Figure 5:
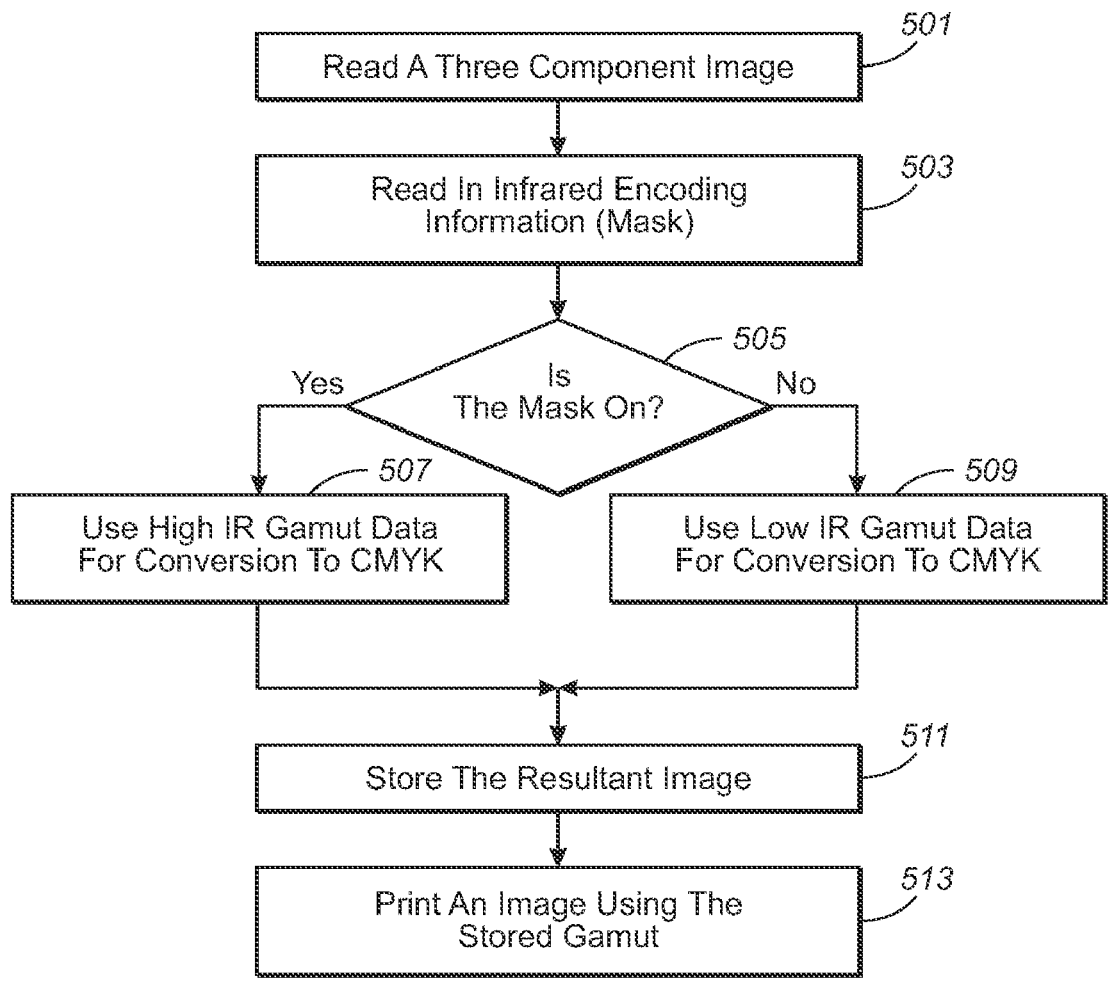
FIG. 5 provides a flow chart of the method using the gamuts.

Now referring to FIG. 5, a method of using a high K and low K resultant gamut is shown. The method begins with reading in a three component image (at step 501). The three component image is read into the printing device. The method continues with reading in infrared and coding information (at step 503). The image is generally the image as seen under natural light. The infrared encoding information or the mask may be seen under infrared light. The printing device can read in these two components which will constitute the strategy for printing.

The method continues (at step 505) with determining, while printing, if the mask is on. At step 507 the printer will use the high infrared gamut data for conversion to CMYK. In the alternative (at step 509) when the mask is not on, the printer will use the low infrared gamut data for conversion to CMYK.

The method continues (at step 509) with storing the resultant image. The image, after implementation of this process will, under visual light, show the desired image and under infrared light show the encoded masked information. The image may then be printed (at step 511) using the stored gamuts.

The above-description merely provides a disclosure of the particular embodiments and is not intended for purposes of limiting the same thereto. As such, this disclosure is not limited to only the above-described embodiments, rather, it is recognized that one skilled in the art could conceive alternative embodiments that fall into the scope of the invention.

The above description also used the term "toner" to identify colorants used in, e.g.: xerographic devices. it is well understood that the process outlined above would also work in ink-based or any other colorant based systems, as long as at least one of the inks or colorants has a clearly distinguishable infrared characteristic.

It will be appreciated that there are various other embodiments of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for infrared watermarking using modified gray component replacement/undercolor removal schemes comprising:
   implementing a low infrared absorption gamut color conversion strategy yielding an original low infrared absorption gamut, wherein said low infrared absorption gamut color conversion strategy includes utilizing relatively low amounts of black toner comprising high carbon amounts;
   implementing a high infrared absorption color conversion strategy yielding an original high infrared absorption gamut, wherein said high infrared absorption gamut color conversion strategy includes utilizing relatively high amounts of black toner comprising high carbon amounts
   computing a boundary by combining the original low infrared absorption gamut with the original high absorption gamut;
   creating a new low infrared absorption gamut and a new high infrared absorption gamut that each include a similar shape defined by the boundary
   providing new high and low infrared absorption transforms using the new high and low absorption gamuts and using the new high and low infrared absorption transforms for providing an output color mixture, wherein the similar shaped new high and low absorption gamuts are used for color matching such that a watermark and an image are visible as a similar color under a first light source and as a different color under a second light source.

2. The method according to claim 1 wherein said gamut correlation mechanism is a blending of said low infrared absorption gamut and said high infrared absorption gamut.

3. The method according to claim 1 wherein said gamut correlation mechanism is an intersection of said low infrared absorption gamut and said high infrared absorption gamut.

4. The method according to claim 1, further comprising providing an infrared sensing reader for identifying said watermark.

5. The method according to claim 4 wherein said infrared sensing reader is configured to interpret data that may be contained in said watermark.

6. An infrared mark as rendered from a printing device comprising:
   a color mixture derived from at least a high infrared absorption gamut and a low infrared absorption gamut that are similarly shaped defined by a boundary, where each said high infrared absorption gamut and low infrared absorption gamut originated from the correlation of an original high infrared absorption gamut and an original low infrared absorption origination gamut and the color mixture being derived from transforms generated from a lower end of said high infrared absorption gamut and low infrared absorption gamut; and
   a substrate configured to reflect said color mixture, where said high infrared absorption gamut comprises a high amount of carbon black toner relative to said low infrared absorption gamut.

7. The infrared mark according to claim 6 wherein said high infrared absorption gamut and said low infrared absorption gamut are identical.

8. The infrared mark according to claim 6 wherein said infrared mark is configured to delineate variable data information.

9. The infrared mark according to claim 6 wherein the shape of said high infrared absorption gamut and said low infrared absorption gamut is implemented via the intersection of said high infrared absorption origination gamut and said low infrared absorption origination gamut.

10. The infrared mark according to claim 6 wherein the shape of said high infrared absorption gamut and said low infrared absorption gamut is implemented via the blending of said high infrared absorption origination gamut and said low infrared absorption origination gamut the exclusion area.

11. A method for creating an infrared mark on an image comprising:
    Receiving an input image to print;
    adopting a printing strategy yielding a correlative effect between a high infrared absorption gamut and a low infrared absorption gamut where said correlative effect transforms said high infrared absorption gamut and said low infrared absorption gamut into substantially identical shaped gamuts including identical gamut boundaries; and
    using transforms generated from said boundaries for rendering a printing of said input image on an infrared reflective substrate applying said strategy where said high infrared absorption gamut and said low infrared absorption gamut are used alternately in order to create an infrared watermark, wherein said high infrared absorption gamut prints using comparatively high amounts black toner;
    low infrared absorption gamut prints using comparatively low amounts of black toner.

12. The method according to claim 11 wherein said infrared watermark creates an arbitrary image.

13. The method according to claim 11 wherein said printing strategy maps said input image to a blending of said high infrared absorption gamut and said low infrared absorption gamut where at least one of said high infrared absorption gamut or said low infrared absorption gamut's area is excluded from the other.

14. The method according to claim 11 wherein said infrared watermark stores data.

15. The method according to claim 11 wherein said printing strategy maps said input image to a boundary of said low infrared absorption gamut limiting said high infrared absorption gamut to the shape of said low infrared absorption gamut.

* * * * *